United States Patent [19]

Miura et al.

[11] Patent Number: 4,576,725
[45] Date of Patent: Mar. 18, 1986

[54] MAGNETIC FLUID INCORPORATING FINE MAGNETIC POWDER AND METHOD FOR MAKING THE SAME

[75] Inventors: Hirohisa Miura; Hiroshi Satou; Hidenori Katagiri; Toshio Natsume; Hidekazu Azuma, all of Toyota, Japan

[73] Assignee: Toyota Jidosha Kabushiki Kaisha, Toyota, Japan

[21] Appl. No.: 620,094

[22] Filed: Jun. 13, 1984

[30] Foreign Application Priority Data

Jul. 13, 1983 [JP] Japan ................. 58-127441

[51] Int. Cl.[4] ................ H01F 1/28; B22F 9/00
[52] U.S. Cl. ............... 252/62.51; 252/62.55; 75/0.5 B; 75/0.5 BA; 75/0.5 C
[58] Field of Search ........... 252/62.51, 62.52, 62.55; 75/0.5 B, 0.5 BA, 0.5 C

[56] References Cited

U.S. PATENT DOCUMENTS

| 3,531,413 | 9/1970 | Rosensweig | 252/62.51 |
| 3,635,819 | 1/1972 | Kaiser | 252/62.51 |
| 3,700,575 | 10/1972 | Kaiser | 252/62.51 |
| 3,764,540 | 10/1973 | Khalafalla et al. | 252/62.52 |
| 3,806,449 | 4/1974 | Kaiser | 252/62.51 |
| 3,917,538 | 11/1975 | Rosensweig | 252/62.54 |
| 3,981,844 | 9/1976 | Romankiw | 252/62.52 |
| 4,019,994 | 4/1977 | Kelley | 252/62.51 |
| 4,094,804 | 6/1978 | Shimoiizaka | 252/62.52 |
| 4,208,294 | 6/1980 | Khalafalla et al. | 252/62.53 |
| 4,234,437 | 11/1980 | Friberg et al. | 252/62.51 |
| 4,280,918 | 7/1981 | Homola et al. | 252/62.51 |
| 4,315,827 | 2/1982 | Bottenberg et al. | 252/62.52 |
| 4,329,241 | 5/1982 | Massart | 252/62.52 |
| 4,356,098 | 10/1982 | Chagnun | 252/62.51 |
| 4,381,244 | 4/1983 | Berkowitz et al. | 252/62.52 |
| 4,416,721 | 11/1983 | Berkowitz et al. | 252/62.54 |
| 4,430,239 | 2/1984 | Wyman | 252/62.52 |

OTHER PUBLICATIONS

Kaiser et al. (IV) J. Applied Phys. 1970 (41) 1970 pp. 1064–1072.
Kirk-Othmer Encyclopedia of Chemical Technology vol. 19, p. 37.

Primary Examiner—John F. Niebling
Attorney, Agent, or Firm—Oblon, Fisher, Spivak, McClelland & Maier

[57] ABSTRACT

A magnetic fluid having a base liquid and magnetic particles with so small average particle diameter as to be of some hundreds of angstroms dispersed in the base liquid. Such a magnetic fluid is produced by ejecting a molten magnetic metal adiabatically from an expansion nozzle against a bath of a base liquid.

11 Claims, 9 Drawing Figures

MAGNETIC FLUID INCORPORATING FINE MAGNETIC POWDER AND METHOD FOR MAKING THE SAME

BACKGROUND OF THE INVENTION

The present invention relates to a magnetic fluid and to an apparatus and to a method for making a magnetic fluid; and more particularly relates to such a magnetic fluid which is made up of a liquid solvent within which are suspended large numbers of very fine powder particles which are made of magnetic material, and to an apparatus and method for making this type of magnetic fluid.

The present invention was originally made in Japan, and the first patent application made therefor was Japanese Patent Application No. 127441/83, of which priority is being claimed in the present application; and it is hereby desired to incorporate the subject matter of that previous Japanese patent application into this specification by reference; a copy is appended to this specification.

Magnetic fluids have many applications to space technology, being used in spacesuits, in particular as vacuum sealing material for the movable parts and joints of spacesuits, and for tube transportation of liquid in the weightless condition. Thus, along with the expansion of space programs, the civilian as well as the military applications of such magnetic fluids are expected to expand rapidly in the future. However, as principal factors obstructing such expansion of the uses of magnetic fluids, there are the problems that they are very expensive to manufacture, and that their manufacture takes an extremely long time.

The following methods are currently known for manufacturing magnetic fluids:

(A) the method of (1) pulverizing magnetite with a ball mill over a long time period in a non polar organic solvent containing oleic acid together with a long chain unsaturated fatty hydrocarbon, (2) condensing the resultant product, and (3) dispersing it as stabilized in a solvent such as a fatty hydrocarbon or a hydrocarbon halide.

(B) the so called absorption-organic phase dispersion method, in which (1) alkali is added to a solution containing $Fe^{++}$ and $Fe^{+++}$ ions in the ratio of 1 to 2, so that the resultant mixture has a pH value equal to at least 9, (2) the mixture is cured or nurtured under appropriate temperature conditions, (3) then the product is subjected to inclination washing until its pH value becomes 8 or less, (4) then the obtained colloidal magnetite solution is mixed with a sodium oleic acid and stirred at 80° to 90° C., (5) then the resultant product is dewatered, and (6) this product is dispersed in an appropriate organic solvent.

(C) the so called peptizing method, in which (1) ammonia water is added to a solution containing $Fe^{++}$ and $Fe^{+++}$ ions in the ratio of 1 to 2, so as to cause joint precipitation, (2) the mixture is added to a boiling mixture solution of kerosene and oleic acid so as to transform the colloidal magnetite into the oil phase and to remove water by evaporation, and (3) by removal of salts the resultant product is made into a stable magnetic fluid.

However, these methods have the following shortcomings. First, they are costly. Second, they take a very long time. And third, it is difficult to obtain a high concentration colloidal solution. The root reason for these problems is that there has in the prior art been no satisfactory method for making extremely fine particles of magnetic material with average particle diameter equal to one micron or less. Further, although such a substance can be conceived of in theory, there has been no practical way in which such fine magnetic material particles could be dispersed within a base liquid properly and uniformly, even if they could be produced. Accordingly, up to the present, it has not been possible to manufacture a magnetic fluid by adding fine magnetic particles to a base liquid, on an efficient and economical basis.

SUMMARY OF THE INVENTION

In view of the above detailed problems inherent in the prior art methods of making magnetic fluids, the present inventors sought to provide a magnetic fluid in which the magnetic particles were extremely fine, with average diameter on the order of several hundreds of angstroms, and performed many experimental researches in this connection. Now, a result of these experimental researches was that it was possible to efficiently manufacture extremely fine particles of magnetic material, with average diameter on the order of several hundreds of angstroms, by rapidly cooling a vapor of a metal which makes up said magnetic material by adiabatic expansion cooling in a nozzle such as a convergent-divergent nozzle. Also it was remarked that the surface activity of such magnetic particles was high. Accordingly it was conceived of to introduce these particles directly into a base liquid, as they emerged out from the nozzle.

Accordingly, it is the primary object of the present invention to provide a magnetic fluid, a method for making it, and a device for practicing the method, which can efficiently and effectively manufacture a magnetic fluid in which extremely fine particles of magnetic material are dispersed in a base liquid.

It is a further object of the present invention to provide such a magnetic fluid, and a method for making it and a device for practicing the method, which can produce a magnetic fluid without taking a very long time.

It is a further object of the present invention to provide such a magnetic fluid, and a method for making it and a device for practicing the method, which can produce a magnetic fluid at a reasonable cost.

It is a yet further object of the present invention to provide such a magnetic fluid, and a method for making it and a device for practicing the method, which can produce a magnetic fluid of superior properties.

According to the most general aspect of the present invention, these and other objects are accomplished by a magnetic fluid, comprising a base liquid and metallic magnetic particles with average particle diameter of some hundreds of angstroms dispersed therein; by a method for making a magnetic fluid comprising a base liquid and metallic magnetic particles with average particle diameter of some hundreds of angstroms dispersed therein, comprising the step of: directing vapor of a metal through an expansion nozzle means for adiabatic expansion cooling and directing an output flow from said nozzle means against a quantity of said base liquid; and by a device for making a magnetic fluid, comprising: a vaporization chamber for producing a metal vapor in; means for heating said vaporization chamber; an exit flow path from said vaporization chamber, comprising an expansion nozzle means therealong; a magnetic fluid production zone into which said nozzle means leads; a base liquid tank in said magnetic fluid production zone into which a flow out from said nozzle means is directed; and means for evacuating the interior of said device.

According to this concept, the vapor of the metal is condensed in the nozzle means by adiabatic expansion cooling, to form extremely fine metallic magnetic particles with, as specified, particle diameters on the order of several hundreds of angstroms. Since the extremely fine magnetic particles are thus manufactured in vacuum or in a protective environment, and are introduced straight into the tank of base liquid as soon as they are formed and before they can lose their surface activity, they combine very well with the base liquid, having good wettability with respect thereto. Particularly, no detergent or interface activator is required to be utilized, even when the difference between the specific gravity of the magnetic particles and the specific gravity of the base liquid is relatively large. Thereby, there is provided a magnetic fluid with very good intimacy between the base liquid and the magnetic particles, and the magnetic fluid according to the present invention is superior to conventional magnetic fluids, and can be manufactured with a high and also uniform density of magnetic particles as compared with the prior art.

Further, since during the practice of the method of the present invention the jet of gas and particles issuing from the nozzle means against the surface of the base liquid in the tank stirs up said base liquid, thereby the mixing in of the reinforcing particles into the base liquid is ensured to be good and even. As opposed to conventional methods of making magnetic materials, therefore, no special mixing means is necessarily required for amalgamating the magnetic particles into the base liquid. Thereby the efficiency and the economy of the present invention are promoted. However, as a specialization of the present invention, the base liquid in the tank may be specially agitated by a means for doing so, while the magnetic particles are being mixed therewith. This makes for even better homogeneity of the resulting magnetic fluid.

Also, the present invention is well suited to being practiced as a continuous process, rather than in a batch mode, because the magnetic particles are themselves formed in a continuous manner, and because the base liquid in the tank can conveniently be flowed past the outlet of the nozzle means at any desired rate. This further promotes economy and convenience.

The base liquid used should have very little tendency to evaporate in a vacuum, and may be a synthetic high polymer oil such as vacuum oil or electric insulation oil. Further, the magnetic particles may be made of pure iron or the like, or they may be made of alloy of, for example, two metals, such as for example samarium, cobalt, and/or nickel. The use of such materials for the magnetic particles results in the production of a magnetic fluid which has magnetizability to the extent of several times as much as that of conventional magnetic fluids. In the case that the metallic magnetic particles are to be made of an alloy of two or more metals, there are two main alternative specializations of the present invention which may be convenient for alloying the metals together simultaneously with manufacturing the fine metallic magnetic particles in the nozzle means (since in general vaporization of an alloy is not practicable, due to the fact that the vapor pressures of the metals comprised therein generally differ widely).

In one of these specializations, with regard to the method, the above described metal vapor is mixed with vapor of another metal before being passed through said nozzle means, and said metal vapor is passed through another expansion nozzle means for adiabatic expansion cooling before being mixed with said vapor of said another metal and before being passed through said nozzle means; and with regard to the device, it further comprises another vaporization chamber and an exit flow path from said another vaporization chamber with said expansion nozzle means therealong, and it also further comprises another expansion nozzle means upstream of said expansion nozzle means and in said exit flow path from said vaporization chamber but not in said exit flow path from said another vaporization chamber.

In the other of these specializations, with regard to the method, the above described metal vapor is mixed with vapor of another metal before being passed through said nozzle means, and vapor of another metal is also passed through another expansion nozzle means for adiabatic expansion cooling and the output flow from said another nozzle means is directed so as to merge with said output flow from said nozzle means, before the combined flow thereof impinges against said quantity of said base liquid; and with regard to the device, it further comprises another vaporization chamber and an exit flow path from said another vaporization chamber with said expansion nozzle means therealong, and it also further comprises another vaporization chamber for producing another metal vapor in, means for heating said another vaporization chamber, and another exit flow path from said another vaporization chamber, comprising another expansion nozzle means therealong; the outlets of said expansion nozzle means and said another expansion nozzle means being angled towards one another in said magnetic fluid production zone.

Further, it may be very convenient to mix a carrier gas, which should be an inert gas such as argon, with the metal vapor before passing it through the nozzle means for adiabatic expansion cooling. This is because the carrier gas helps to prevent the too quick growth of the metallic magnetic particles through agglomeration during the adiabatic cooling. Also, the use of a carrier gas means that the operating conditions of the nozzle means can be more properly set to produce the best results.

With regard to the operating conditions of the nozzle means, they can be suitably tailored to the particular application. If properly arranged, much of the thermal energy of the metal vapor is converted into kinetic energy by the adiabatic expansion cooling in the nozzle means, and the jet flow out from the nozzle means can be a high speed jet flow of sonic or supersonic speed. Suppose that the pressure and the temperature of the mixture gas upstream of a nozzle means in which adiabatic cooling is performed are $P_1$ (expressed in torr) and $T_1$ (expressed in °K.) and the pressure and temperature of the mixture gas downstream of the nozzle are $P_2$ (again expressed in torr) and $T_2$ (again expressed in °K.), then the temperature $T_2$ may be approximately estimated from the following equation, where k is the specific heat ratio of the mixture gas:

$$T_2 = T_1 \times (P_2/P_1)^{(k-1)/k}$$

Also, the speed $M_2$ of the jet flow from the nozzle means may be approximately estimated from the following equation:

$$M_2 = SQRT((2/(k-1)) \times ((P_2/P_1)^{(k-1)/k} - 1))$$

In the case of a convergent nozzle being used for the adiabatic expansion cooling, the flow speed $M_2$ of the mixture gas passing out from the convergent nozzle reaches Mach 1 when the pressure $P_2$ at the outlet of the nozzle means reaches $P_1 \times (2/(k-1))^{(2/(k-1))}$, and thereafter the speed $M_2$ does not increase any further, even when the pressure $P_2$ decreases further. On the other hand, in the case of a convergent-divergent nozzle being used for the adiabatic expansion cooling, the flow speed $M_2$ of the mixture gas passing out from such a convergent-divergent nozzle continues further to increase sharply as the value of the ratio $P_2/P_1$ decreases further, and reaches Mach 4 when $P_2/P_1$ equals about 1/100. Now, the temperature $T_1$ upstream of the nozzle means may be appropriately selected according to the vapor pressure of the metal for making the magnetic material, but for example when $T_1$ is equal to 2273° K. (2000° C.) and the specific heat ratio k of the mixture gas is equal to 1.667, then according to the pressure ratio $P_2/P_1$ the temperature $T_2$ of the fluid downstream of the nozzle means and the speed $M_2$ of the jet flow from out of the nozzle means will be as shown in Table 1, which is provided at the end of this specification and before the claims thereof. From this Table 1, it can be seen that, for example, when the pressure ratio $P_2/P_1$ is equal to 1/100, then the temperature $T_2$ is equal to 360° K. (87° C.), and the speed of the jet flow $M_2$ is equal to 3.99 (approximately 1900 m/sec). Thus, by appropriately controlling the various parameters of the process such as the shape and dimensions of the nozzle means, the pressure conditions before and after the nozzle means, and the operating conditions of the nozzle means, thereby it is possible to appropriately specify the speed of the jet flow from the nozzle means and its temperature. It will be understood from the above that the use of a convergent-divergent nozzle is preferable, because thus it is possible to arrange for the size of the magnetic particles to be reduced, and likewise the range of variation of their diameters can be kept low. As mentioned above, this is facilitated by the use of an inert carrier gas, because thereby the ratio of the pressures $P_1$ and $P_2$ before and after the nozzle means can be relatively easily controlled. Further, other parameters being assumed to be acceptable, it is found that, the faster is the speed of the jet flow from the nozzle means, the better is the stirring up effect and the better is the dispersion of the magnetic particles in the base liquid. Yet further, since most of the kinetic energy in the jet from the nozzle means is converted into heat as said jet impinges on the surface of the base liquid, it is preferable to set the temperature $T_2$ of the jet as it thus hits on the surface of the base liquid to be somewhat cooler than the most appropriate temperature of the base liquid, in order for the magnetic fluid to be kept at a constant temperature as it is being made.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENTS

The present invention will now be described with reference to the preferred embodiments thereof, and with reference to the appended drawings.

Embodiment One

Figures 1, 3:
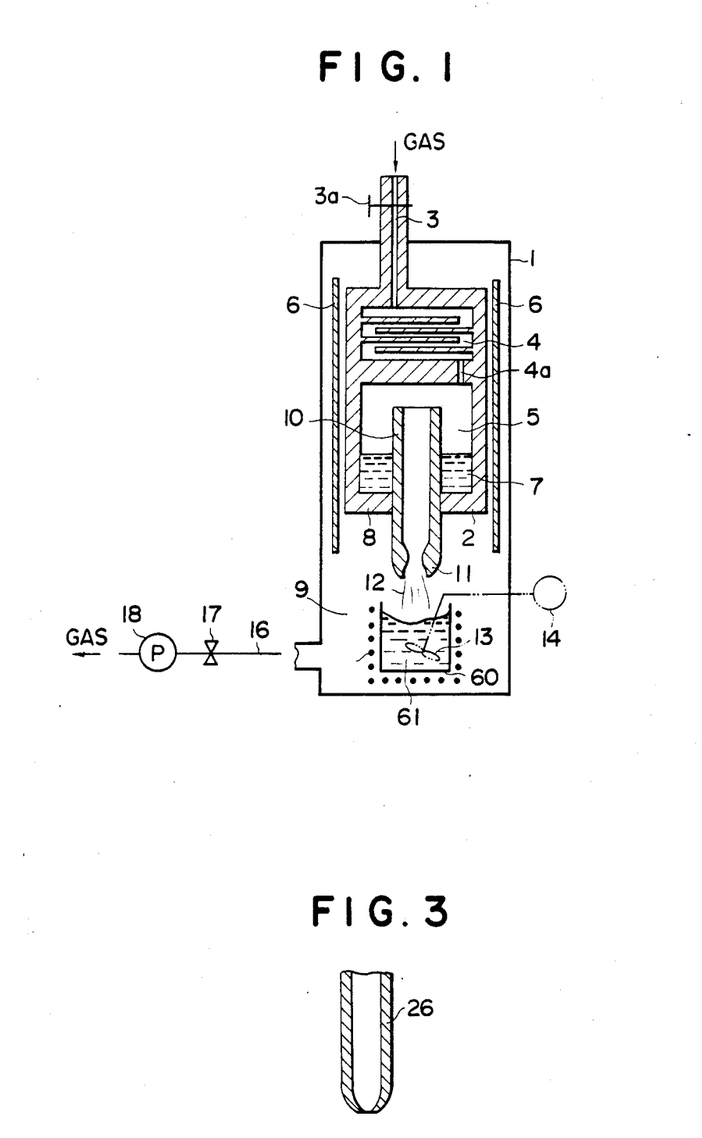
FIG. 1 is a schematic sectional view of an apparatus which is the first preferred embodiment of the device of the present invention and incorporates a convergent-divergent nozzle and a base liquid tank, for making a magnetic fluid which is a first preferred embodiment of the magnetic fluid of the present invention, in a manner according to the first preferred embodiment of the method of the present invention.
FIG. 3 is a partial longitudinal sectional view of a convergent nozzle incorporated in a modified version of said first apparatus embodiment, for making a modified version of said first material embodiment.

FIG. 1 shows a schematic cross section of the first preferred embodiment of the device of the present invention. In this figure, the reference numeral 1 denotes a furnace shell which is formed as a substantially closed container. In the upper part of this furnace shell 1 there is disposed a melting pot 2, the upper portion of which is formed with a gas preheating chamber 4 to which is communicated a gas introduction aperture 3 which is communicated with the outside for introduction of a reaction gas such as nitrogen gas under the control of a valve 3a, and thelower portion of which is formed with a metallic vapor production chamber 5 which is communicated via an aperture 4a with the gas preheating chamber 4. A heater 6 is disposed around the melting pot 2 for keeping it at a predetermined temperature which will be hereinafter referred to as $T_1$, and a mass 7 of metal charged into the lower part of the metallic vapor production chamber 5 is kept in the molten state by the action of this heater 6 and is, further, boiled so as to emit metallic vapor.

Through the bottom wall 8 of the chamber 5 there is fitted a conduit 10 which leads to a magnetic fluid production zone 9, and the upper end of this conduit 10 protrudes quite a long way into the metallic vapor production chamber 5 so as to open to the upper portion of said chamber 5, above the surface of the molten metal mass 7 therein. The interior of this conduit defines a nozzle 11 which in this first preferred embodiment is of the convergent-divergent type, and this nozzle 11 opens downward into the magnetic fluid production zone 9 so as to direct a jet flow 12 of gas and powder downwards thereinto as will be explained shortly. Below the end of the nozzle 11 in the magnetic fluid production zone 9 and displaced therefrom by a certain distance there is provided, for catching fine magnetic material powder particles produced in the jet flow 12 as will be explained shortly, opposing the tip of the convergent-divergent nozzle 11 at a certain distance away therefrom, a tank 60 adapted for receiving a quantity of base liquid 61. A heater, which is not shown, may be provided for keeping warm this base liquid 61 (if actually extra heat is required for this purpose). A vacuum pump 18 is provided for exhausting, via a conduit 16 under the control of a valve 17, the gas introduced through the gas introduction aperture 3 from the magnetic fluid production zone 9 and from the whole device, so as to maintain the interiors of the metallic vapor production chamber 5 and of the magnetic fluid production zone 9 at predetermined pressures, which will be hereinafter referred to as $P_1$ and $P_2$ respectively. In some variations of this first preferred embodiment (to be explained later), a propeller 13 driven by a pump 14 is provided for stirring the base liquid 61 in the tank 60; since these elements are optional they are shown by double dotted lines in the figure.

By using the device for making magnetic fluid shown in FIG. 1 and described above, magnetic fluid, the first preferred embodiment of the product of the present invention, using as a base liquid vacuum oil made by Matsumura Sekiyu K.K., type MR-200, specific gravity 0.87, and using as magnetic particle dispersion material therein very fine particles of pure iron powder, was made according to the first preferred embodiment of the method of the present invention, as follows. First, a mass 7 of 100 gm of metallic iron (electrolytic iron, purity 99.8%) was charged into the lower part of the metallic vapor production chamber 5, and also a quantity 61 of said vacuum oil specified above was charged into the base liquid tank 60. Then the temperature of the first melting pot 2 and the chambers 4 and 5 defined therein was rapidly raised to a temperature $T_1$ of approximately 2000° C. by operating the heater 6, while a steady flow of argon gas was introduced through the gas introduction aperture 3. Thus the iron in the chamber 5 was melted, and was further steadily boiled to produce iron vapor in the chamber 5, this iron vapor mixing with the argon gas flowing into said chamber 5. The mixture gas thus produced then entered the upper end of the conduit 10 and passed down through said conduit 10, to pass through the convergent or throat portion of the nozzle 11 into the expansion portion of said nozzle. In this expansion portion, the mixture gas was cooled at a very high rate by adiabatic expansion cooling, to an estimated temperature $T_2$ of about 100° C., thereby producing very fine particles of iron. The flow out from this expansion portion of the nozzle 11 then was expelled as a jet flow 12 from the downstream end of said nozzle 11, said jet flow 12 squirting into the magnetic fluid production zone 9 and being directed downwards at the base liquid in the tank 60, which was kept at a temperature substantially equal to room temperature. During the above processing, the vacuum pump 18 was operated at such an appropriate rate, the valve 17 was so adjusted, and the flow rate of the argon gas introduced through the gas introduction aperture 3 was so controlled, as to keep the pressure $P_1$ within the metallic vapor production chamber 5 at approximately 20 torr, this pressure being also dependent on the temperature at which the mass of metallic iron 7 was heated up, and the pressure $P_2$ within the magnetic fluid production zone 9 at approximately 0.2 torr.

During this process, the mixture gas consisting of argon gas and iron vapor, as it passed through the nozzle 11 and was rapidly expanded and underwent rapid adiabatic cooling, formed extremely small particles of iron very quickly, so that the flow consisted substantially of a jet of said small particles of iron carried along on a flow of excess argon gas. These fine powder particles were finally expelled from the nozzle 11 into the magnetic fluid production zone 9 as the jet 12, which impinged on the surface of the quantity 61 of vacuum oil contained in the tank 60. The fine iron powder particles in the jet flow 12 were entrained into this vacuum oil, thus helping to agitate the vacuum oil so as to disperse the entrained iron powder particles through its entire region, while the excess argon gas was continuously exhausted from the apparatus by the pump 18. Finally, when all the iron in the first melting pot 2 had been consumed, the apparatus was allowed to cool, and the quantity of base liquid and iron magnetic particles entrained thereinto, contained in the tank 60, was removed and examined.

Figure 2:
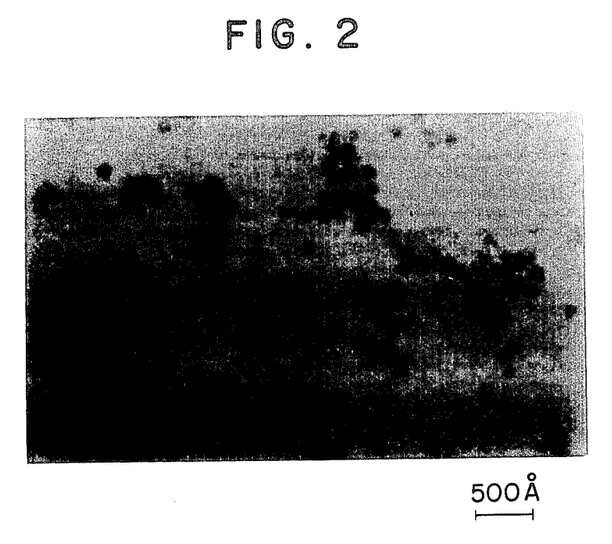
FIG. 2 is a transmission electron micrograph of the first preferred embodiment of the magnetic fluid of the present invention, produced by the apparatus of FIG. 1, in which very fine pure iron particles are the dispersed magnetic material and vacuum oil is the base fluid.

FIG. 2 is a transmission electron micrograph of this material, i.e. of the first preferred embodiment of the magnetic fluid of the present invention, as produced by the apparatus of FIG. 1. It will be understood from this figure that the iron particles of the magnetic fluid (the dark or mottled spots in the figure) are very well dispersed in the base liquid (the grayish background portion), despite their extremely small size.

Next, tests were made of the magnetic fluid according to this first preferred embodiment. First, using a magnetic flux meter (of type 3251 made by Yokokawa Denki K.K.), the magnitude of the magnetization of the magnetic fluid described above was measured, by setting the magnetic fluid to 6000 oersted. The results of this measurement, along with the specific gravity of the magnetic fluid, the range of particle diameters of the iron particles included therein, and the average diameter of the iron particles, are shown in column I of Table 2, which is provided at the end of this specification and before the claims thereof. And similar tests were also carried out on test samples of the following three magnetic fluids, which are also embodiments of the present invention: (a) a magnetic fluid made under the same conditions as the above described Embodiment One, except for the difference that the vacuum oil and magnetic particles in the tank 60 were stirred up by a propeller 13 driven by a motor 14, as suggested in FIG. 1 by the double dotted lines, as the process was being performed; (b) a magnetic fluid made under the same conditions as the above described Embodiment One, except for the difference that a convergent nozzle 26 as shown in FIG. 3 in longitudinal cross section was used as the cooling nozzle, instead of the convergent-divergent nozzle II of Embodiment One; and (c) a magnetic fluid made under the same conditions as the above described Embodiment One, except for the difference that no argon gas was introduced through the port 3 to be mixed with the iron vapor in the metallic vapor production chamber 5, so that iron vapor alone was passed through the nozzle 11. The results of the same measurements carried out on these modified embodiments are also shown in Table 2, in its columns II, III, and IV respectively. Also in this Table 2 for comparison, in its last two columns, there are shown the results of these same measurements as carried out on two comparison conventional magnetic fluids (which are not embodiments of the present invention), namely magnetic fluids "LS-25" and "L-25", magnetite as their magnetic material particles, and both made by Tohoku Kinzoku K.K..

Thus, it was found that a magnetic fluid using, as dipersed magnetic powder material in the base liquid, magnetic powder in which the particle diameters were very much smaller than those attainable in the prior art was able to be economically manufactured by the method of the present invention in the apparatus shown. It will also be understood, by comparison of the magnetic properties of the magnetic fluid produced according to this invention, that the small size of the particles of dispersed magnetic material resulted in very much improved magnetic characteristics.

Embodiment Two

Figure 4:
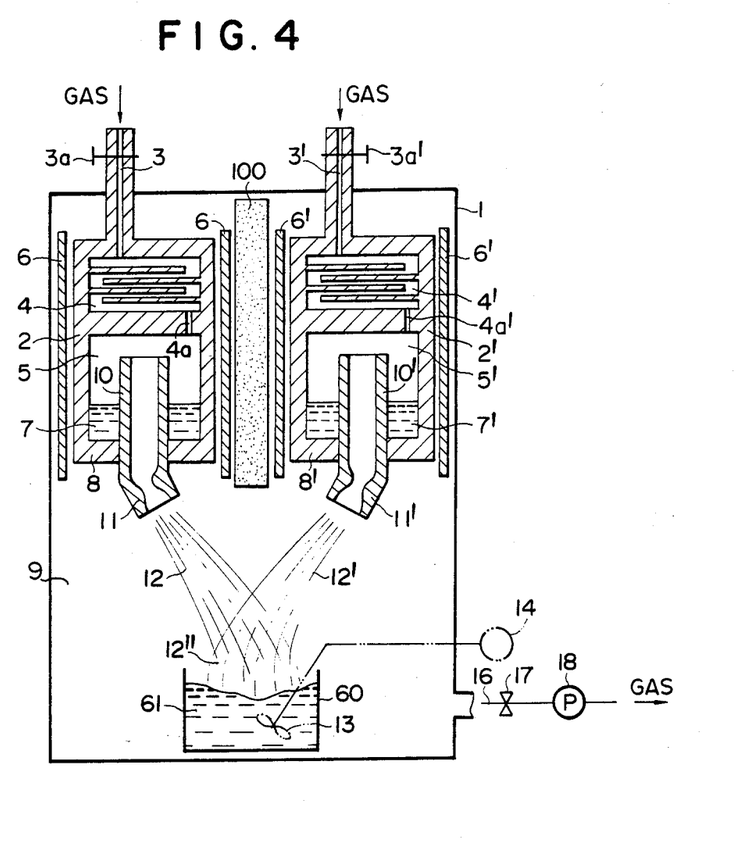
FIG. 4 is a schematic view, similar to FIG. 1, of an apparatus which is the second preferred embodiment of the device of the present invention and this time incorporates two convergent-divergent nozzles which point at one another at an angle, for making a magnetic fluid which is a second preferred embodiment of the magnetic fluid of the present invention, according to the second preferred method embodiment of the present invention.

In FIG. 4, there is shown a schematic sectional view of a second preferred embodiment of the device for making a composite reinforced material of the present invention, in a fashion similarly to FIG. 1 with respect to the first apparatus embodiment. In this figure, parts which are similar to parts of the first preferred embodiment shown in FIG. 1 and which have the same functions are denoted by the same reference numerals.

In this second device embodiment, as before there is provided a furnace shell 1 which is formed as a substantially closed container. In the upper part of this furnace shell 1 there are disposed first and second melting pots 2 and 2', the upper portions of which are respectively formed with gas preheating chambers 4 and 4' to which are respectively communicated gas introduction apertures 3 and 3' which are communicated with the outside, under the control of valves 3a and 3a' respectively, for introduction of flows of a gas such as argon gas, and the lower portions of which are formed with metallic vapor production chambers 5 and 5' which are communicated via apertures 4a and 4a' with the gas preheating chambers 4 and 4' respectively. Heaters 6 and 6' are disposed around the first and second melting pots 2 and 2' respectively for keeping them at predetermined temperatures which will be hereinafter referred to as $T_1$ and $T_1'$ respectively, and masses 7 and 7' of metal charged into the lower parts of the metallic vapor production chambers 5 and 5' are kept in the molten state by the action of these heaters 6 and 6' and are, further, boiled so as to emit metallic vapor. A piece of insulation material 100 is interposed between the two heaters 6 and 6' for the two melting pots 2 and 2' so as to thermally isolate them from one another, so as to ensure that the two temperatures $T_1$ and $T_1'$ can be independently determined according to operational requirements.

Through the bottom walls 8 and 8' of the chambers 5 and 5' there are respectively fitted conduits 10 and 10' which lead to a magnetic fluid production zone 9, and the upper ends of these conduits 10 and 10' protrude quite a long way into their respective metallic vapor production chambers 5 and 5' so as to open to the upper portions of said chambers 5 and 5', above the surfaces of the molten metal masses 7 and 7' therein. The interiors of these conduits define nozzles 11 and 11' which in this second preferred embodiment again are of the convergent-divergent type, and these nozzles 11 and 11' open downwards and towards one another into the magnetic fluid production zone 9 so as to direct jet flows 12 and 12' of gas and powder downwards thereinto as will be explained shortly, said jet flows 12 and 12' being angled towards one another so as to collide and form a combined jet flow 12''. Below the ends of the nozzles 11 and 11' in the magnetic fluid production zone 9 and displaced therefrom by a certain distance there is provided, for catching fine magnetic powder particles produced in the jet flows 12 and 12' as will be explained shortly, opposing the tips of the convergent-divergent nozzles 11 and 11' at a certain distance away therefrom, a tank 60 adapted for receiving a quantity of base liquid 61. A heater, which is not shown, may be provided for keeping warm the base liquid 61, if actually extra heat is required for this purpose. In some variations of this second preferred embodiment (to be explained later), again a propeller 13 driven by a pump 14 is provided for stirring the base liquid 61 in the tank 60; since these elements are optional they again are shown by double dotted lines in the figure. A vacuum pump 18 is provided for exhausting, via a conduit 16 under the control of a valve 17, the gas such as argon gas introduced through the gas introduction apertures 3 and 3' from the magnetic fluid production zone 9 and from the whole device, so as to maintain the interiors of the metallic vapor production chambers 5 and 5' and of the magnetic fluid production zone 9 at predetermined pressures, which will be hereinafter referred to as $P_1$, $P_1'$, and $P_2$ respectively. The pressures $P_1$ and $P_1'$ of the two metallic vapor production chambers 5 and 5' may be independently controlled by varying the amounts of gas flowed in through the gas introduction ports 3 and 3'.

By using the device for making magnetic fluid shown in FIG. 2 and described above, magnetic fluid, the second preferred embodiment of the product of the present invention, including as a base liquid vacuum oil made by Matsumura Sekiyu K.K., type MR-200, specific gravity 0.87, and including as magnetic particle dispersion material therein very fine powder particles of an alloy of samarium and cobalt was made according to the second preferred embodiment of the method of the present invention, as follows. First, masses 7 and 7' of 50 gm each of metallic samarium and metallic cobalt were charged into the lower parts of the metallic vapor production chambers 5 and 5' respectively, and also a quantity 61 of said vacuum oil specified above was charged into the base liquid tank 60. Then the temperature of the first melting pot 2 and the chambers 4 and 5 defined therein was rapidly raised to a temperature $T_1$ of approximately 1100° C. by operating the heater 6, and the temperature of the second melting pot 2' and the chambers 4' and 5' defined therein was rapidly raised to a temperature $T_1'$ of approximately 1200° C. by operating the heater 6', while steady flows of argon gas were introduced through the gas introduction apertures 3 and 3'. Thus the samarium in the chamber 5 was melted, and was further steadily boiled to produce samarium vapor in the chamber 5, this samarium vapor mixing with the argon gas flowing into said chamber 5, while likewise the cobalt in the chamber 5' was melted, and was further steadily boiled to produce cobalt vapor in the chamber 5', this cobalt vapor mixing with the argon gas flowing into said chamber 5'. The respective mixture gases thus produced then entered the upper ends of the respective conduits 10 and 10' and passed down through said conduits 10 and 10', to pass through the convergent or throat portions of the nozzles 11 and 11' into the expansion portions of said nozzles. In these expansion portions, the mixture gases were cooled at very high rates by adiabatic expansion cooling, to estimated temperatures $T_2$ of about 100° C. and $T_2'$ of about 350° C., thereby producing very fine particles of samarium and cobalt respectively in the liquid state. The flows out from these expansion portions of the nozzles 11 and 11' then were expelled as jet flows 12 and 12' from the downstream ends of said nozzles 11 and 11', said jet flows 12 and 12' squirting into the magnetic fluid production zone 9 and being directed towards one another as well as generally downwards at the base liquid in the tank 60, which was kept at a temperature substantially equal to room temperature. During the above processing, the vacuum pump 18 was operated at such an appropriate rate, the valve 17 was so adjusted, and the flow rates of the argon gas introduced through the gas introduction apertures 3 and 3' were so controlled, as to keep the pressure $P_1$ within the metallic vapor production chamber 5 containing the samarium at approximately 20 torr and the pressure $P_1'$ within the metallic vapor production chamber 5' containing the cobalt also at approximately 20 torr, these pressures being also dependent on the temperatures and rates at which the mass of metallic samarium 7 and metallic cobalt 7' were heated up, and the pressure $P_2$ within the magnetic fluid production zone 9 at approximately 0.2 torr.

During this process, the mixture gases consisting of argon gas and respectively samarium and cobalt vapor, as they passed through the nozzles 11 and 11' and were rapidly expanded and underwent rapid adiabatic cooling, formed extremely small liquid particles of samarium and cobalt respectively very quickly, so that the flows consisted substantially of jets of said small liquid particles of samarium and cobalt respectively carried along on flows of excess argon gas. These fine particles were finally expelled from the nozzles 11 and 11' into the magnetic fluid production zone 9 as the jets 12 and 12', which collided together to form the combined jet 12''. When this happened, the fine liquid particles of samarium and cobalt combined together to make fine particles of an alloy of samarium and cobalt, which then solidified in due course as the combined flow descended in the zone 9 to impinge on the surface of the quantity 61 of vacuum oil contained in the tank 60. The fine samarium-cobalt alloy powder particles in the combined jet flow 12'' were entrained into this vacuum oil, thus helping to agitate the vacuum oil so as to disperse the entrained Sm-Co alloy powder particles through its entire region, while the excess argon gas was continuously exhausted from the apparatus by the pump 18. Finally, when all the samarium in the first melting pot 2 and all the cobalt in the second melting pot 2' had been consumed, the apparatus was allowed to cool, and the quantity of base liquid and Sm-Co alloy magnetic particles entrained thereinto, contained in the tank 60, was removed and examined.

Figure 5:
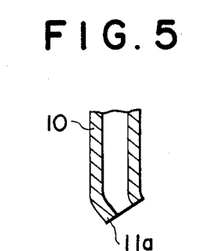
FIGS. 5 and 6 are partial longitudinal sectional views of convergent nozzles incorporated in a modified version of said second apparatus embodiment, for making a modified version of said second material embodiment.
Figure 6:
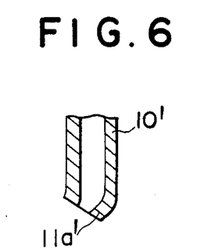

Next, tests were made of the magnetic fluid according to this second preferred embodiment. First, using a magnetic flux meter of the same type as before the magnitude of the magnetization of the magnetic fluid described above was measured, again by setting the magnetic fluid to 6000 oersted. The results of this measurement, along with the specific gravity of the magnetic fluid, the range of particle diameters of the iron particles included therein, and the average diameter of the iron particles, are shown in column I of Table 3, which is provided at the end of this specification and before the claims thereof. And similar tests were also carried out on test samples of the following three magnetic fluids, which are also embodiments of the present invention: (a) a magnetic fluid made under the same conditions as the above described Embodiment Two, except for the difference that the vacuum oil and magnetic particles in the tank 60 were stirred up by a propeller 13 driven by a motor 14, as suggested in FIG. 4 by the double dotted lines, as the process was being performed; (b) a magnetic fluid made under the same conditions as the above described Embodiment Two, except for the difference that convergent nozzles 11a and 11a' as shown in FIGS. 5 and 6 in longitudinal cross section were used as the cooling nozzles, instead of the convergent-divergent nozzles 11 and 11' of Embodiment Two; and (c) a magnetic fluid made under the same conditions as the above described Embodiment Two, except for the difference that no argon gas was introduced through the ports 3 and 3' to be mixed with the samarium and cobalt vapors in the metallic vapor production chambers 5 and 5', so that respectively samarium and cobalt vapors alone were passed through the nozzles 11 and 11'. The results of the same measurements carried out on these modified embodiments are also shown in Table 3, in its columns II, III, and IV respectively.

Thus, it was found that a magnetic fluid using, as dispersed magnetic powder material in the base liquid, magnetic powder in which the particle diameters were very much smaller than those attainable in the prior art was able to be economically manufactured by the method of the present invention in the apparatus shown. It will also be understood, by consideration of the magnetic properties of the magnetic fluid produced according to this invention, that the small size of the particles of dispersed magnetic material, Sm-Co alloy in this case, resulted in very much improved magnetic characteristics.

Embodiment Three

Figures 7, 8, 9:
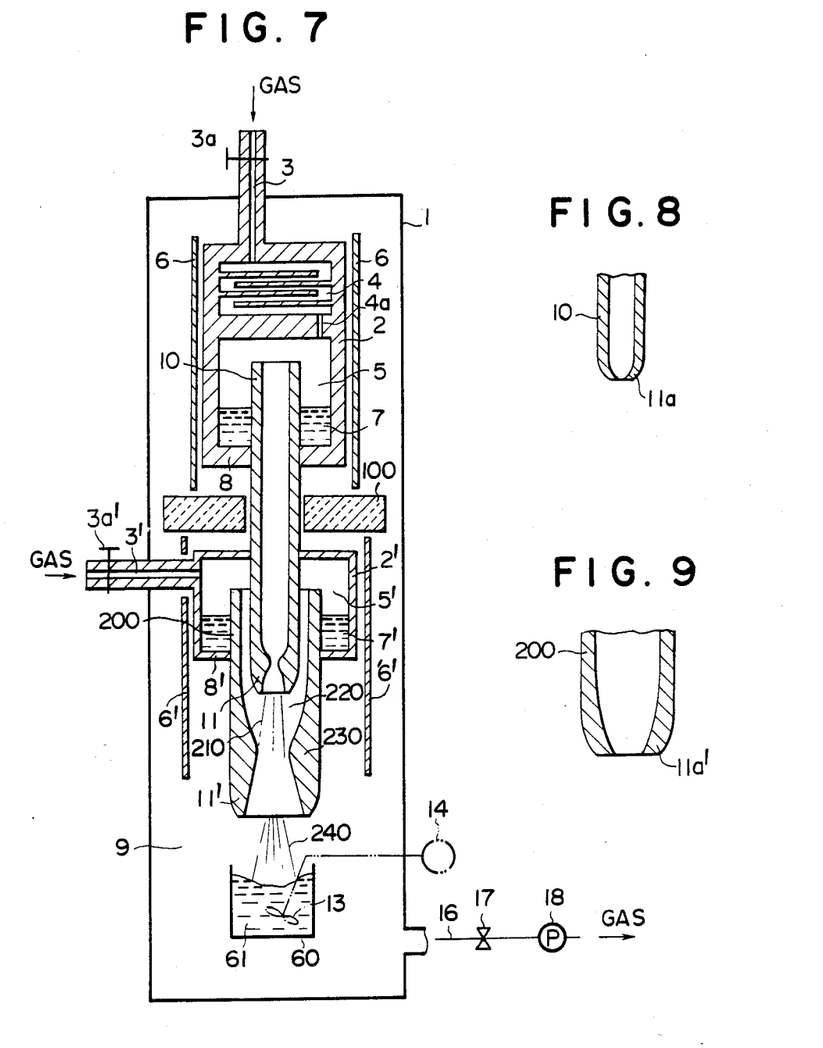
FIG. 7 is a schematic sectional view, similar to FIGS. 1 and 4, of an apparatus which is the third preferred embodiment of the device of the present invention and this time incorporates two convergent-divergent nozzles one of which directs its output jet into the input of the other, for making a magnetic fluid which is a third preferred embodiment of the magnetic fluid of the present invention, according to the third preferred method embodiment of the present invention.
FIGS. 8 and 9 are partial longitudinal sectional views of convergent nozzles incorporated in a modified version of said third apparatus embodiment, for making a modified version of said third material embodiment.

In FIG. 7, there is shown a schematic sectional view of the third preferred embodiment of the device for making a composite reinforced material of the present invention, in a fashion similarly to FIGS. 1 and 4 with respect to the first and second apparatus embodiment respectively. In this figure, parts which are similar to parts of the first and second preferred embodiments shown in FIGS. 1 and 4 and which have the same or similar functions are denoted by the same reference numerals.

In this third device embodiment, as before there is provided a furnace shell 1 which is formed as a substantially closed container. In the upper part of this furnace shell 1 there is disposed a first melting pot 2, below which in the middle part of the furnace shell 1 there is disposed a second melting pot 2'. The upper portion of the first melting pot 2 is formed with a gas preheating chamber 4 to which is communicated a gas introduction aperture 3, controlled by a valve 3a, which is communicated with the outside for introduction of flow of a gas such as argon gas, and the lower portion of said first melting pot 2 is formed with a first metallic vapor production chamber 5 which is communicated via an aperture 4a with the gas preheating chamber 4. And a gas introduction aperture 3', controlled by a valve 3a', is provided likewise communicating from the outside for introduction of a flow of a gas such as argon gas to a second metallic vapor production chamber 5' defined within the second melting pot 2'; no gas preheating chamber is provided for this second melting pot 2'. Heaters 6 and 6' are disposed around the first and second melting pots 2 and 2' respectively for keeping them at predetermined temperatures which will be hereinafter referred to as $T_1$ and $T_2$ respectively, and masses 7 and 7' of metal charged into the lower parts of the metallic vapor production chambers 5 and 5' are kept in the molten state by the action of these heaters 6 and 6' and are, further, boiled so as to emit metallic vapor. A piece of insulation material 100 is interposed between the two heaters 6 and 6' for the two melting pots 2 and 2' so as to thermally isolate them from one another, so as to ensure that the two temperatures $T_1$ and $T_2$ can be independently determined according to operational requirements.

Through the bottom wall 8 of the first metallic vapor production chamber 5 there is fitted a first relatively narrow conduit 10 which leads downwards, and the upper end of this first conduit 10 protrudes quite a long way into the first metallic vapor production chamber 5 so as to open to the upper portion of said chamber 5, above the surface of the molten metal mass 7 therein. The interior of this first conduit 10 defines a first nozzle 11 which in this third preferred embodiment again is of the convergent-divergent type. The first conduit 10 extends downwards through the roof of the second melting pot 2, and its lower end sticks into the upper end opening of a second relatively wide conduit 10', which is fitted through the bottom wall 8' of the second metallic vapor production chamber 2', and whose upper end protrudes into the second meteallic vapor production chamber 5' so as to open above the surface of the molten metal mass 7' therein. Thus, the first nozzle 11 opens at an intermediate portion of said second conduit 10', in fact in the convergent part 220 or near the throat 230 of a second convergent-divergent nozzle 11' defined by the inside surfce of said second conduit 10'. In other words, in combination the two nozzles 11 and 11' constitute in cooperation an ejector nozzle. The second nozzle 11' opens downwards into a magnetic fluid production zone 9, which is defined below the second melting pot 2', so as to direct a combined jet flow 240 of gas and powder downwards thereinto as will be explained shortly. Below the end of the nozzle 11 in the magnetic fluid production zone 9 and displaced therefrom by a certain distance there is provided, for catching fine magnetic powder particles produced in the jet flow 240 as will be explained shortly, opposing the tip of the convergent-divergent nozzle 11 at a certain distance away therefrom, a tank 60 adapted for receiving a quantity of base liquid 61. A heater, which is not shown, may be provided for keeping warm the base liquid 61, if actually extra heat is required for this purpose. In some variations of this third preferred embodiment, again a propeller 13 driven by a pump 14 may be provided for stirring the base liquid 61 in the tank 60; again, since these elements are optional they are shown by double dotted line in the figure. A vacuum pump 18 is provided for exhausting, via a conduit 16 under the control of a valve 17, the gas such as argon gas introduced through the gas introduction apertures 3 and 3' from the magnetic fluid production zone 9 and from the whole device, so as to maintain the interiors of the metallic vapor production chambers 5 and 5', of the convergent part 220 of the second convergent-divergent nozzle 11', and of the magnetic fluid production zone 9 at predetermined pressures, which will be hereinafter referred to as $P_1$, $P_2$, $P_3$, and $P_4$ respectively. The pressures $P_1$ and $P_1'$ of the two metallic vapor production chambers 5 and 5' may be independently controlled by varying the amounts of gas flowed in through the gas introduction ports 3 and 3'.

By using the device for making magnetic fluid shown in FIG. 7 and described above, magnetic fluid, the third preferred embodiment of the product of the present invention, including as a base liquid vacuum oil made by Matsumura Sekiyu K.K., type MR-200, specific gravity 0.87, and including as magnetic particle dispersion material therein very fine powder particles of an alloy of cobalt and nickel was made according to the third preferred embodiment of the method of the present invention, as follows. First, masses 7 and 7' of 50 gm each of metallic cobalt (purity 99.5%) and metallic nickel (purity 99.9%) were changed into the lower parts of the metallic vapor production chambers 5 and 5' respectively, and also a quantity 61 of said vacuum oil specified above was charged into the base liquid tank 60. Then the temperature of the first melting pot 2 and the chambers 4 and 5 defined therein was rapidly raised to a temperature $T_1$ of approximately 2000° C. by operating the heater 6, and the temperature of the second melting pot 2' and the chamber 5' defined therein was rapidly raised to a temperature $T_2$ of approximately 2000° C. by operating the heater 6', while steady flows of argon gas were introduced through the gas introduction apertures 3 and 3'. Thus the cobalt in the chamber 5 was melted, and was further steadily boiled to produce cobalt vapor in the chamber 5, this cobalt vapor mixing with the argon gas flowing into said chamber 5, while likewise the nickel in the chamber 5' was melted, and was further steadily boiled to produce nickel vapor in the chamber 5', this nickel vapor mixing with the argon gas flowing into said chamber 5'. The mixture gas produced in the chamber 5, consisting of argon gas mixed with cobalt vapor, then entered the upper end of the conduit 10 and passed down through said conduit 10, to pass through the convergent or throat portions of the nozzle 11 into the expansion portion of said nozzle. In this expansion portion, the mixture gas was cooled at a very high rate by adiabatic expansion cooling, to an estimated temperature $T_3$, as it emerged into the convergent part 220 of the second convergent-divergent nozzle 11', of about 1300° C., thereby producing very fine of cobalt in the liquid state. This flow 210 out from the outlet of the first nozzle 11 was then entrained a flow of nickel vapor and argon gas from the second metallic vapor production chamber 5' which was entering the mouth of the second conduit 10' and sucked it in. During this entraining process, the molten particles of cobalt became alloyed with nickel which they abstracted from the flow of nickel vapor and argon gas. Then, the combined flow entered into the throat portion 230 of the second nozzle 11' and passed through the convergent or throat portion of said second nozzle 11 into the expansion portion of said nozzle. In this expansion portion, the mixture gas was again cooled at a very high rate by adiabatic expansion cooling, to an estimated temperature $T_4$ of about 300° C., thereby producing very fine particles of cobalt-nickel alloy in the solid state. The jet flow 240 out from the downstream end of said second nozzle 11' then squirted into the magnetic fluid production zone 9 and was directed downwards at the base liquid in the tank 60, which was kept at a temperature substantially equal to room temperature. During the above processing, the vacuum pump 18 was operated at such an appropriate rate, the valve 17 was so adjusted, and the flow rates of the argon gas introduced through the gas introduction apertures 3 and 3' were so controlled, as to keep the pressure $P_1$ within the metallic vapor production chamber 5 containing the cobalt at approximately 5 torr, the pressure $P_2$ within the metallic vapor production chamber 5' containing the nickel at approximately 2 to 3 torr, these pressures being also dependent on the temperatures and rates at which the mass of metallic cobalt 7 and metallic nickel 7' were heated up, the pressure $P_3$ within the convergent part 220 of the second convergent-divergent nozzle 11' at about 1 to 2 torr, and the pressure $P_4$ within the magnetic fluid production zone 9 at about 0.05 to 1 torr.

During this process, the fine cobalt-nickel alloy powder particles in the combined jet flow 240 were entrained into this vacuum oil, thus helping to agitate the vacuum oil so as to disperse the entrained Co-Ni alloy powder particles through its entire region, while the excess argon gas was continuously exhausted from the apparatus by the pump 18. Finally, when all the cobalt in the first melting pot 2 and all the nickel in the second melting pot 2' had been consumed, the apparatus was allowed to cool, and the quantity of base liquid and Co-Ni alloy magnetic particles entrained thereinto, contained in the tank 60, was removed and examined.

Next, tests were made of the magnetic fluid according to this third preferred embodiment. First, using a magnetic flux meter of the same type as before the magnitude of the magnetization of the magnetic fluid described above was measured, again by setting the magnetic fluid to 6000 oersted. The results of this measurement, along with the specific gravity of the magnetic fluid, the range of particle diameters of the iron particles included therein, and the average diameter of the iron particles, are shown in column I of Table 4, which is provided at the end of this specification and before the claims thereof. And similar tests were also carried out on test samples of the following three magnetic fluids, which are also embodiments of the present invention: (a) a magnetic fluid made under the same conditions as the above described Embodiment Three, except for the difference that the vacuum oil and magnetic particles in the tank 60 were stirred up by a propeller 13 driven by a motor 14, as suggested in FIG. 7 by the double dotted lines, as the process was being performed; (b) a magnetic fluid made under the same conditions as the above described Embodiment Two, except for the difference that convergent nozzles 11a and 11a' as shown in FIGS. 8 and 9 in longitudinal cross section were used as the cooling nozzles, instead of the convergent-divergent nozzles 11 and 11' of Embodiment Three; and (c) a magnetic fluid made under the same conditions as the above described Embodiment Three, except for the difference that no argon gas was introduced through the ports 3 and 3' to be mixed with the cobalt and nickel vapors in the metallic vapor production chambers 5 and 5', so that cobalt vapor alone was passed through the first nozzle 11, and this cobalt vapor was mixed with nickel vapor alone in the convergent part 220 of the second convergent-divergent nozzle 11'. The results of the same measurements carried out on these modified embodiments are also shown in Table 4, in its columns II, III, and IV respectively.

Thus, it was again found that a magnetic fluid using, as dispersed magnetic powder material in the base liquid, magnetic powder in which the particle diameters were very much smaller than those attainable in the prior art was able to be economically manufactured by the method of the present invention in the apparatus shown. It will also be understood, by consideration of the magnetic properties of the magnetic fluid produced according to this third embodiment of the present invention, that the small size of the particles of dispersed magnetic material, Co-Ni alloy in this case, resulted in very much improved magnetic characteristics. Particularly, it is seen that when the base liquid was stirred as the magnetic particles were being blown into it by the jet flow from the nozzle, the evenness of distribution of the particles in the liquid was very good, accordingly producing a magnetic liquid with particularly good properties, far better than those of conventional magnetic fluids. Further, it can be seen that the use of convergent-divergent nozzle as the cooling nozzle was particularly beneficial. However, when alternatively a convergent nozzle was used, and also when no inert gas was used as a carrier gas but instead metal vapor alone was blown through the nozzle or nozzles, then the variation of the particle diameters became somewhat greater, but even in this case it was possible to evenly disperse in the base fluid magnetic material particles having much smaller particle diameters than in the case of conventional magnetic fluids, and accordingly to produce magnetic fluids of much improved qualities.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, the ceramic small particles including in the particles of the reinforcing material of the magnetic fluid according to this invention need not be particles of a nitride, as was exemplarily shown in the described embodiments, but could be made of other ceramic materials such as oxides, carbides, or borides of various metals. Other modifications are also possible. Also, it is not essential that the material which is reacted with the element in the gas to form the very small ceramic particles should be the same material as is used for the matrix material of the reinforcing particles, although it is beneficial that the two materials should be the same from the point of view of obtaining good affinity between the ceramic particles and their matrix material. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

TABLE 1

| $P_2/P_1$ | 1/5 | 1/10 | 1/20 | 1/50 | 1/100 | 1/200 |
|---|---|---|---|---|---|---|
| $T_2(^\circ K)$ | 1194 | 905 | 686 | 475 | 360 | 273 |
| $M_2$(Mach) | 1.65 | 2.13 | 2.64 | 3.37 | 3.99 | 4.69 |

TABLE 2

| | EMBODIMENT ONE AND MODIFICATIONS | | | | COMPARISON SAMPLES | |
|---|---|---|---|---|---|---|
| | I | II | III | IV | LS-25 | L-25 |
| INTENSITY OF MAGNETIZATION (G) | 600 | 590 | 520 | 550 | 250 | 180 |
| SPECIFIC GRAVITY | 1.17 | 1.16 | 1.15 | 1.17 | 1.15 | 1.10 |
| PARTICLE DIAMETERS (angstroms) | 50–250 | 50–250 | 80–400 | 80–300 | — | — |
| AVERAGE PARTICLE DIAMETER (angstroms) | 110 | 110 | 200 | 150 | — | — |

TABLE 3

| EMBODIMENT TWO AND MODIFICATIONS | | | | |
|---|---|---|---|---|
| | I | II | III | IV |
| INTENSITY OF MAGNETIZATION (G) | 900 | 900 | 500 | 640 |
| SPECIFIC GRAVITY | 1.12 | 1.13 | 1.11 | 1.10 |
| PARTICLE DIAMETERS (angstoms) | 30–150 | 30–150 | 100–220 | 80–150 |
| AVERAGE PARTICLE DIAMETER (angstroms) | 80 | 80 | 150 | 110 |

TABLE 4

| EMBODIMENT THREE AND MODIFICATIONS | | | | |
|---|---|---|---|---|
| | I | II | III | IV |
| INTENSITY OF MAGNETIZATION (G) | 680 | 670 | 470 | 520 |
| SPECIFIC GRAVITY | 1.13 | 1.09 | 1.10 | 1.08 |
| PARTICLE DIAMETERS (angstroms) | 40–200 | 40–200 | 50–350 | 50–300 |
| AVERAGE PARTICLE DIAMETER (angstroms) | 110 | 110 | 160 | 130 |

What is claimed is:

1. A magnetic fluid, comprising a base liquid and metallic magnetic particle with average particle diameter of some hundreds of angstroms dispersed therein, said metallic magnetic particles each being suspended in said base liquid as each being directly generated from a metallic vapor through rapid cooling by adiabiatic expansion of said metallic vapor and thereafter directly introduced into a bath of said base liquid.

2. A magnetic fluid according to claim 1, wherein said magnetic particles have average particle diameter of less than two hundred angstroms.

3. A magnetic fluid according to clam 1, wherein said magnetic particles are made of iron.

4. A magnetic fluid according to claim 1, wherein said magnetic particles are made of a cobalt and samarium.

5. A magnetic fluid according to claim 1, wherein said magnetic particles are made of cobalt and nickel.

6. A method for making magnetic fluid comprising a base liquid and metallic magnetic particles with average particle diameter of some hundred angstrums dispersed therein, comprising the steps of: preparing a quantity of high temperature stable vapor of a metal, directing said vapor through an expansion nozzle means for adiabatic expansion cooling thereof enough to condense said vapor into particles of said diameter, and directing an output flow from said nozzle means against a quantity of said base liquid.

7. A method according to claim 6, wherein said metal vapor is mixed with a carrier gas before being passed through said nozzle means.

8. A method according to claim 6, wherein said quantity of base liquid is agitated while said output flow is being directed thereagainst.

9. A method according to claim 6, wherein said metal vapor is mixed with vapor of another metal before being passed through said nozzle means.

10. A method according to claim 9, wherein said metal vapor is passed through another expansion nozzle means for adiabatic expansion cooling before being mixed with said vapor of said another metal and before being passed through said nozzle means.

11. A method according to claim 6, wherein vapor of another metal is also passed through another expansion nozzle means for adiabatic expansion cooling and the output flow from said another nozzle means is directed so as to merge with said output flow from said nozzle means, before the combined flow thereof impinges against said quantity of said base liquid.

* * * * *